United States Patent
Ramachandran

(10) Patent No.: US 6,950,578 B1
(45) Date of Patent: Sep. 27, 2005

(54) HIGHLY INDEX-SENSITIVE OPTICAL DEVICES INCLUDING LONG PERIOD FIBER GRATINGS

(75) Inventor: Siddharth Ramachandran, Hoboken, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/856,912

(22) Filed: May 28, 2004

(51) Int. Cl.$^7$ .............................. G02B 6/34; G02B 6/26
(52) U.S. Cl. .......................................... 385/37; 385/39
(58) Field of Search .............................. 385/10–13, 27, 385/31, 37, 39, 28, 48, 123–124

(56) References Cited

U.S. PATENT DOCUMENTS

| | | |
|---|---|---|
| 5,864,641 A | 1/1999 | Murphy et al. |
| 5,999,671 A | 12/1999 | Jin et al. |
| 6,072,922 A | 6/2000 | Albin et al. |
| 6,097,862 A | 8/2000 | Abramov et al. |
| 6,128,427 A | 10/2000 | Espindola et al. |
| 6,154,590 A | 11/2000 | Jin et al. |
| 6,314,222 B1 | 11/2001 | Jang et al. |
| 6,337,937 B1 | 1/2002 | Takushima et al. |
| 6,343,168 B1 | 1/2002 | Murphy et al. |
| 6,351,585 B1 | 2/2002 | Amundson et al. |
| 6,385,368 B1 | 5/2002 | Amundson et al. |
| 6,408,117 B1 | 6/2002 | Mollenauer |
| 6,463,684 B2 | 10/2002 | Jang |
| 6,522,810 B2 | 2/2003 | Takushima et al. |
| 6,563,984 B1 | 5/2003 | Harumoto et al. |
| 6,647,192 B1 | 11/2003 | Yoshida et al. |
| 6,768,824 B2 * | 7/2004 | Ramachandran ............. 385/11 |
| 6,768,835 B2 * | 7/2004 | Ramachandran ............. 385/28 |
| 6,885,792 B2 * | 4/2005 | Eggleton et al. .............. 385/37 |
| 2003/0002794 A1 | 1/2003 | Ramachandran |
| 2004/0042714 A1 * | 3/2004 | Ramachandran ............. 385/28 |
| 2004/0081383 A1 * | 4/2004 | Ramachandran ............. 385/11 |

OTHER PUBLICATIONS

Zhiyong Wang, Siddharth Ramachandran "Ultrasensitive long-period fiber gratings for broadband modulators and sensors" Optics Letters/vol. 28. No. 24/ Dec. 15, 2003.

* cited by examiner

Primary Examiner—Akm Enayet Ullah

(57) ABSTRACT

A long period fiber grating (LPG) device is formed to exhibit a "turn-around-point" (TAP) in a phase matching curve when the group velocities of two propagating modes are matched. When the grating period of the LPG is selected to coincide with the TAP, a large tuning bandwidth is formed. This device has been found to be highly sensitive to changes in the refractive index of the ambient surrounding the LPG (recognizing a change in refractive index as low as $10^{-4}$), allowing the device to be used as a sensor for trace elements in the atmosphere. The ability of the TAP LPG to modify the intensity of a propagating optical signal as a function of changes in the refractive dielectric of a surround material also allows for this device to be used as an all-fiber high speed optical signal modulator.

13 Claims, 5 Drawing Sheets

HIGHLY INDEX-SENSITIVE OPTICAL DEVICES INCLUDING LONG PERIOD FIBER GRATINGS

TECHNICAL FIELD

The present invention relates to long period fiber gratings (LPGs) and, more particularly, to "turn around point" (TAP) LPGs configured to exhibit an arbitrary bandwidth and capable of recognizing changes in ambient refractive index on the order of $10^{-4}$ or lower.

BACKGROUND OF THE INVENTION

Tunable attenuators are ubiquitous in fiber optic systems, as a result of the wide variety of applications they enable. In particular, tunable attenuators may be used to dynamically alter the input power at an amplifier node of an optical communication system, where this functionality is necessary to maintain constant gain and low noise figures. The desired time scales for such variable optical attenuators ranges from minutes to sub-microseconds. Alternatively, devices that can provide rapid attenuation changes in a fiber optic line (at rates of, for example, sub-microseconds to picoseconds) may be utilized to realize high speed modulators for encoding data in a communication system. On the other hand, devices whose attenuation changes in response to varying ambient conditions (such as, for example, outside temperature, pressure, chemical compositions, etc.) are of immense importance to sensor technologies employing fiber optic detection schemes. In particular, devices with high sensitivity to the ambient refractive index of chemical compositions would be attractive for realizing sensors used for identifying trace gases or chemicals in the atmosphere.

Long period fiber gratings (LPGs) are mode conversion devices that have been used extensively to provide components that offer wavelength-selective attenuation in a wavelength division multiplexed (WDM) communication system. Dynamic tuning of the spectral characteristics of LPGs has been achieved by a variety of techniques. For example, LPGs that couple the core mode to a cladding mode can be tuned dynamically by modulating the refractive index of an outer or inner cladding material that is interrogated by a cladding mode of the fiber. The refractive index of such cladding materials can be varied by temperature, the electro-optic effect or some nonlinear optical effect, depending on the nature of the cladding material used. Alternatively, the LPGs may be mechanically strained to change the refractive index, using, for example, piezo-electric packages, simple motion control housings or magnetically latchable materials. The tuning mechanisms described above serve to shift the spectral response of LPGs from one center wavelength to another. While these techniques are useful for tuning the wavelength-selective attenuation in a fiber optic system, they are not sensitive enough to enable detection of small ambient changes in refractive index due to trace gases in the ambient environment, or to provide high speed modulation (on the order of 100 Ghz or higher). Typically, an ambient refractive index change ($\Delta n$) of at least 0.01 is required to achieve "complete" tuning ("complete" being defined as a tunable device that changes state from fully transparent to >20 dB attenuation). To date, means of increasing the grating sensitivity have concentrated on etching fibers down to very small outer diameters (OD) to obtain a cladding mode that is significantly more sensitive to ambient index changes. The highest sensitivity reported to date is on the order of $2 \times 10^{-3}$, from fibers etched to an outer diameter of 32 $\mu$m. Since trace elements typically change ambient indices by less than a factor of $10^{-4}$, and high speed electro-optic elements yield index changes on the order of $5 \times 10^{-4}$, the etching fiber arrangement remains inadequate. Additionally, a fiber with an outer diameter of only 32 $\mu$m would be significantly unreliable as a result of the diminished strength of thin fibers.

In addition, the tuning that is most desirable for dynamic filters is tuning of the strength (loss) of the coupling, not tuning of the resonant wavelength itself. The prior art is replete with "tuning" arrangements that alter the resonant wavelength, but very little has been reported on providing the ability to tune the strength of the coupled signal. One prior art article by V. Grubsky et al., entitled "*Long-period fiber gratings with variable coupling for real-time sensing applications*", appearing in *Optics Letters*, Vol. 25, p. 203 (2000), discloses an arrangement for broadening the bandwidth of LPGs by coupling to a higher-order cladding mode. In this arrangement, greater than 50 nm coupling was achieved, albeit with weak coupling strengths. Grubsky et al. provided the coupling strength tuning using either ambient temperature or applied mechanical strain. While this arrangement achieved coupling strength tuning, the sensitivity of the response is considered to be too low for use in high speed modulation or trace element detection schemes. In the Grubsky et al. arrangement, the sensitivity was fixed by the cladding mode order chosen to induce coupling. Moreover, the wavelength of coupling was constrained by the specific cladding mode that afforded tunable attenuation.

Thus, there exists a remaining need in the art for a fiber grating device that can offer strong tunable attenuation, preferably over bandwidths exceeding 20 nm, whose coupling strength is tuned by small changes in the refractive index of the active material. The active material may either be a coating whose index changes are due to incorporation of trace elements in the atmosphere, or an electro-optic or nonlinear-optic material that changes index as a result of an applied electric field or optical radiation. A practical device would also allow operation at any desired wavelength without impacting the sensitivity, since the desired wavelength of operation would be different for various applications.

SUMMARY OF THE INVENTION

The need remaining in the prior art is addressed by the present invention, which relates to long period fiber gratings (LPGs) and, more particularly, to "turn-around-point" (TAP) LPGs configured to exhibit an arbitrary bandwidth and capable of recognizing changes in ambient refractive index on the order of $10^{-4}$ or lower. In particular, if a fiber waveguide is engineered to yield two modes with identical group velocities, a broadband spectrum is obtained in which the strength (or loss), rather than the resonant wavelength, varies when tuned. This approach yields strong broadband loss-filters, in which the LPG couples the core mode to a specific higher order cladding mode whose group velocity equals that of the core mode. Such gratings are thus referred to as "turn-around-point" (TAP) LPGs.

In accordance with the present invention, it has been found that by matching the group velocities of one or more propagating signal modes to form a TAP LPG, the grating properties of the LPG become extremely sensitive to the refractive index of the outer cladding (e.g., "ambient") material. Since there exist a number of techniques well-known in the art to adjust an optical signal group velocity, it is possible to create a TAP LPG whose refractive index sensitivity can be arbitrarily adjusted, while independently selecting the operational wavelength range of interest.

An advantage of this inventive TAP LPG is that it facilitates construction of a device with arbitrary sensitivity to the ambient refractive index, and can do so at any desired wavelength of operation. The index sensitivities that are achievable with this inventive arrangement are such that trace elements in the atmosphere may be sensed, or the inventive device can be combined with high-speed electro-optic nonlinear optical or refracto-optic materials to realize a high-speed fiber optic modulator.

Other and further advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
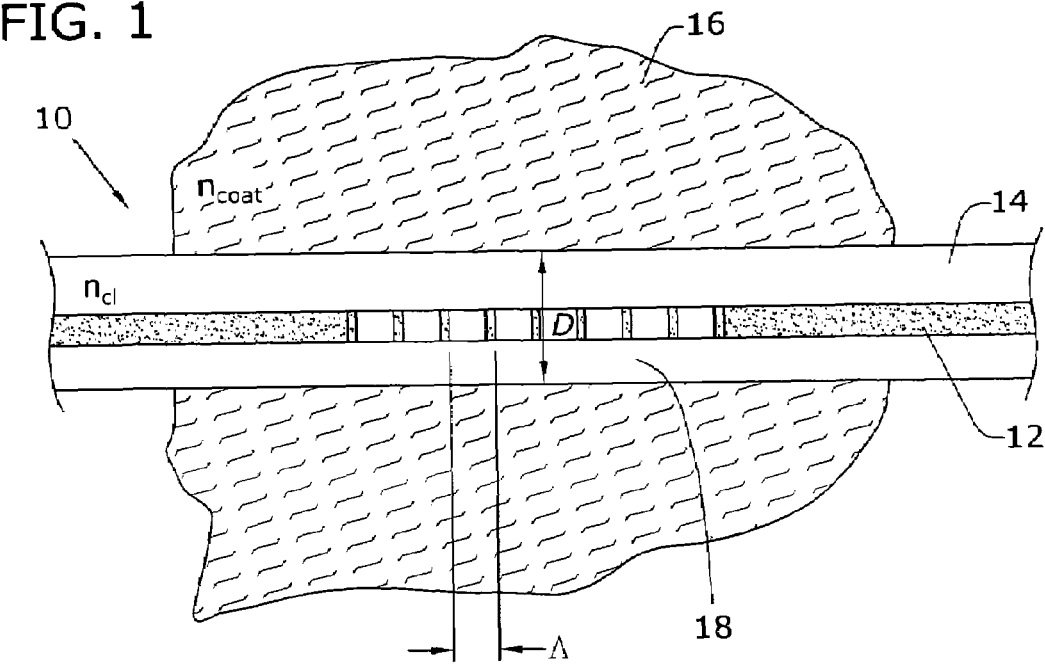
FIG. 1 illustrates an exemplary LPG device, denoting the various parameters that may be adjusted to form a "turn-around-point" (TAP) LPG in accordance with the present invention.

An exemplary long period grating (LPG)-based device 10 of the present invention is illustrated in FIG. 1. LPG device 10 comprises a single mode fiber with a core area 12 and a cladding region 14 surrounding core area 12. As shown, cladding region 14 is defined as comprising an outer diameter D and a refractive index denoted $n_{cl}$. A "coating"/ambient region 16 is illustrated as surrounding device 10, where coating/ambient region 16 may comprise organic materials such as polymers, inorganic materials such as semiconductors or glasses, or a gaseous ambient such as air containing a trace gas or chemical substance, where the latter is of great concern with respect to finding a suitable detector. A grating 18 of a predetermined period Λ is written in core area 12 as shown. In accordance with the present invention, the material comprising cladding region 14 is selected such that $n_{cl}$ (the refractive index of cladding region 14) will be greater than $n_{coat}$, the refractive index of coating/ambient region 16. In forming device 10, the outer diameter D of cladding region 14 needs to be carefully chosen, along with the period Λ of grating 18 in order to provide the desired ambient index sensitivity, high-speed operation or wideband filtering, as desired.

Figure 2:
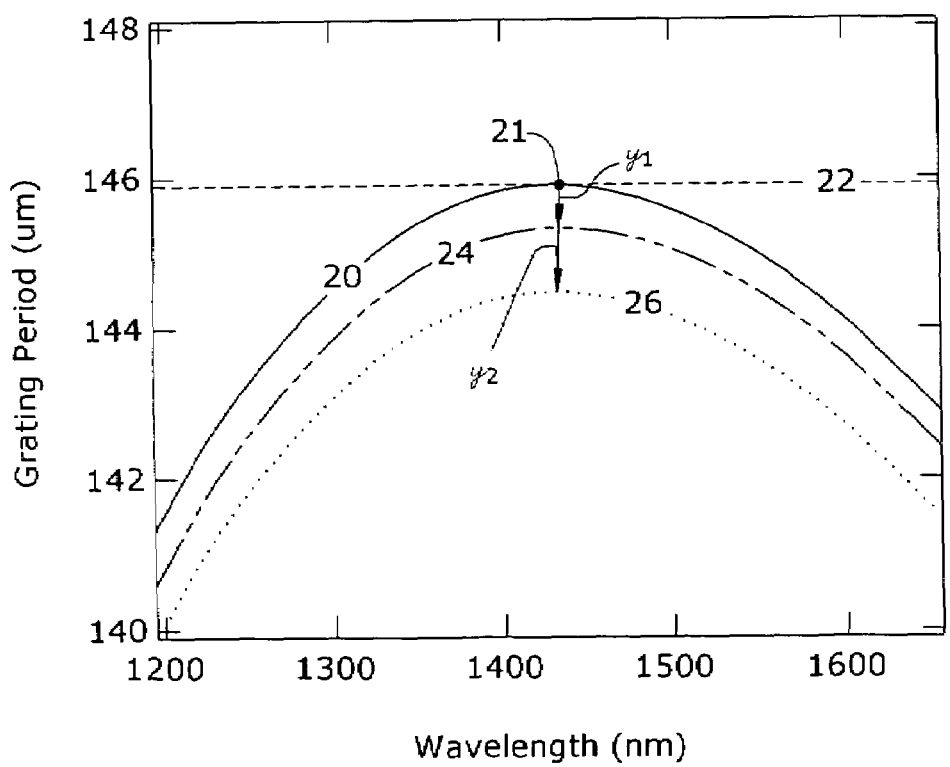
FIG. 2 contains a graph of phase matching curves for three different ambient refractive index conditions, also plotting a horizontal line defining the actual grating period of the LPG.
Figure 3:
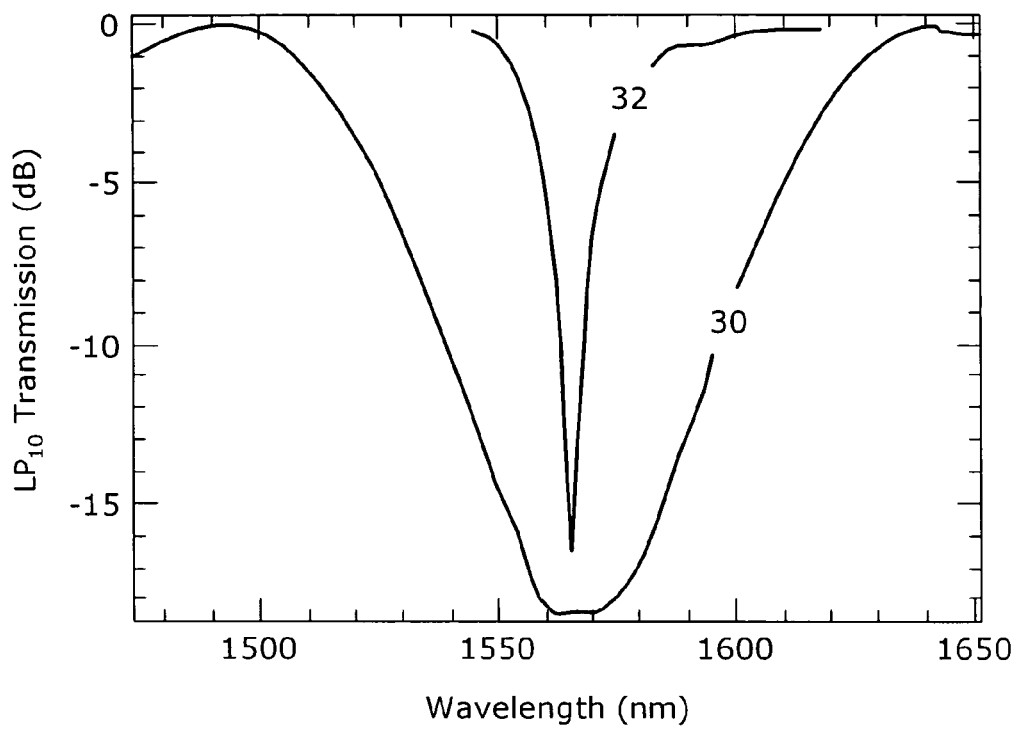
FIG. 3 illustrates the spectrum associated with the phase matching curve of FIG. 2 that exhibits the TAP resonance condition, that is, the phase-matching curve whose TAP coincides with the grating period.

FIG. 2 illustrates the phase matching curve 20 for an LPG that couples the fundamental mode propagating in core area 12 to the higher order mode propagating in cladding region 14, both modes propagating at the same group velocity in accordance with the present invention. Indeed, this matching of group velocity results in curve 20 exhibiting a turn-around-point (TAP) 21 at the wavelength (and period) where the slope of curve 20 is zero. Referring to FIG. 2, the grating period for the LPG is illustrated as horizontal line 22, where this particular arrangement has a grating period Λ of 146 μm. It has previously been demonstrated that when the LPG grating period is chosen to couple the phase matching curve at the TAP, large bandwidth mode coupling is achieved. Phase matching curve 20 of FIG. 2 is one such arrangement, defined hereinafter as exhibiting the "TAP resonance condition". FIG. 3 illustrates the exemplary large bandwidth coupling in curve 30, which illustrates a typical spectrum of light remaining in the fundamental mode (propagating in core area 12) after the higher-order cladding mode is stripped out for the TAP resonance condition of curve 20 in FIG. 2. For the sake of comparison, a conventional, prior art spectrum 32 associated with a narrowband LPG is also shown in FIG. 3. It is apparent that bandwidth improvements by a factor of one hundred or more can be achieved when modes exhibiting the TAP resonance condition (i.e., matching group velocities) are selected for coupling.

Figure 4:
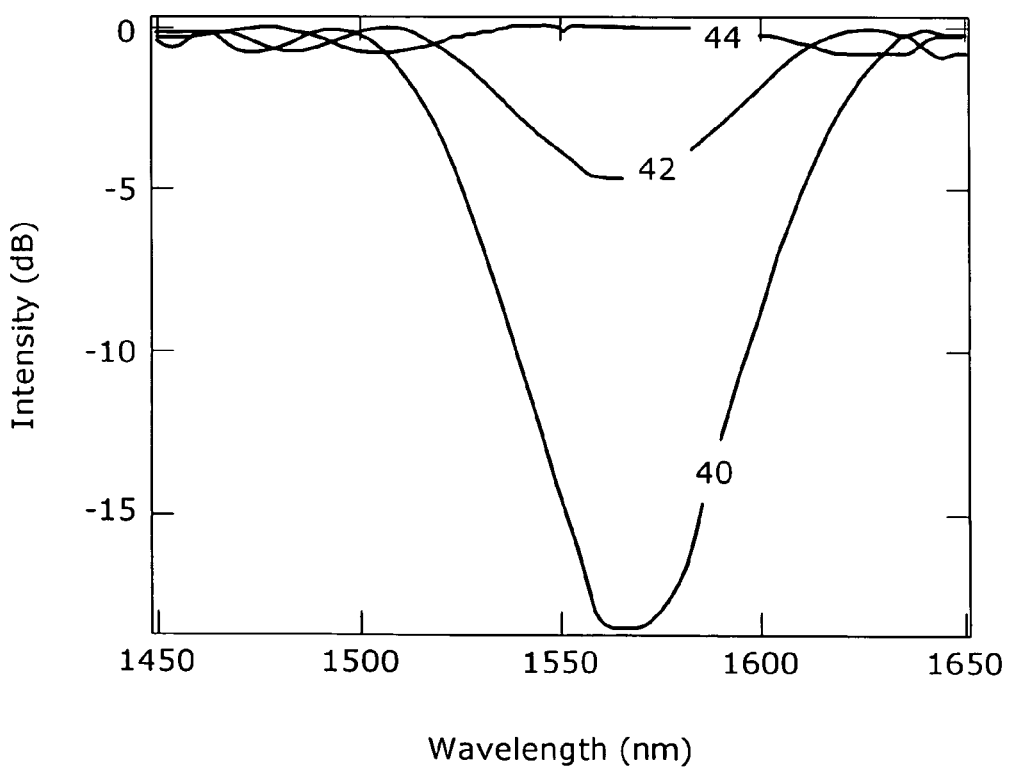
FIG. 4 is a graph illustrating the spectra for all three phase matching curves of FIG. 2.

Referring back to FIG. 2, additional phase matching curves 24 and 26 are shown, where these curves are associated with fibers having a progressively higher refractive index coating region 16 (i.e., increasing $n_{coat}$), while exhibiting the same outer diameter D and grating period Λ. As shown, curve 24 is separated from the TAP resonance condition grating value (line 22) by a first distance $y_1$ and curve 26 is separated from the TAP resonance condition grating value (line 22) by a second distance $y_2$. FIG. 4 contains the spectra associated with all three phase matching curves 20, 24 and 26 of FIG. 2, where spectrum 40 of FIG. 4 is associated with curve 20 and is identical to spectrum 30 of FIG. 3. Continuing, spectrum 42 of FIG. 4 is associated with curve 24 of FIG. 2 and spectrum 44 of FIG. 4 is associated with curve 26 of FIG. 2. As is evident from FIG. 4, slight changes in the coating refractive index lead to significant changes in the coupling strength (loss) of the grating. It is to be noted that while the strength of the coupling changes, the spectral shape remains nominally the same. This is in contrast to conventional prior art narrowband LPGs, where the tuning shifts the resonant wavelength of the spectrum.

The origin of the coupling effect/refractive index sensitivity relationship of the present invention can best be understood by realizing that the coupling efficiency, η, of an LPG (i.e., the factor that determines the amount of light coupled by the LPG) is defined by:

$$\eta = (\kappa L)^2 \cdot \frac{\sin^2\left(\sqrt{(\kappa L)^2 + (\delta L)^2}\right)}{(\kappa L)^2 + (\delta L)^2},$$

where $\kappa$ is the coupling coefficient, which is proportional to the amount of index change induced in the fiber, L is the physical length of the grating and $\delta$ is a detuning parameter, defined as:

$$\delta = \frac{1}{2}\left([\beta_{01} - \beta_{0,12}] - \frac{2\pi}{\Lambda}\right),$$

where $\lambda$ is the propagating wavelength, $\Lambda$ is the period of the grating, and $\beta_{01}$ and $\beta_{0,12}$ are the propagating constants of the fundamental and an exemplary higher-order mode, respectively. Thus, in light of the definition of TAP from above (where the group velocities of the modes are equal), a resonance occurs and strong coupling is achieved when the condition $\delta=0$ is satisfied. The coupling efficiency relation, in the above equation, indicates that the coupling strength decreases with a Sinc function dependence as $\delta$ deviates from zero. The detuning parameter relation represents the resonance condition for an LPG, where phase matching curve 20 of FIG. 2 is indeed a curve of this function/condition, measuring wavelength $\lambda$ as a function of grating period $\Lambda$ when $\delta=0$. From these two equations, it can be deduced that for phase matching curves 24 and 26, $\delta$ is greater than 0 at all wavelengths. This implies, therefore, that the coupling strength is less than optimal for all wavelengths along curves 24 and 26. Additionally, it is apparent from FIG. 2 that $\delta$ becomes progressively larger as the curves move further away from the TAP resonance condition. Likewise, the corresponding spectra of FIG. 4 are illustrated as evidencing progressively weaker coupling as $\delta$ increases (which, in turn, increases as the coating refractive index increases).

Figure 5:
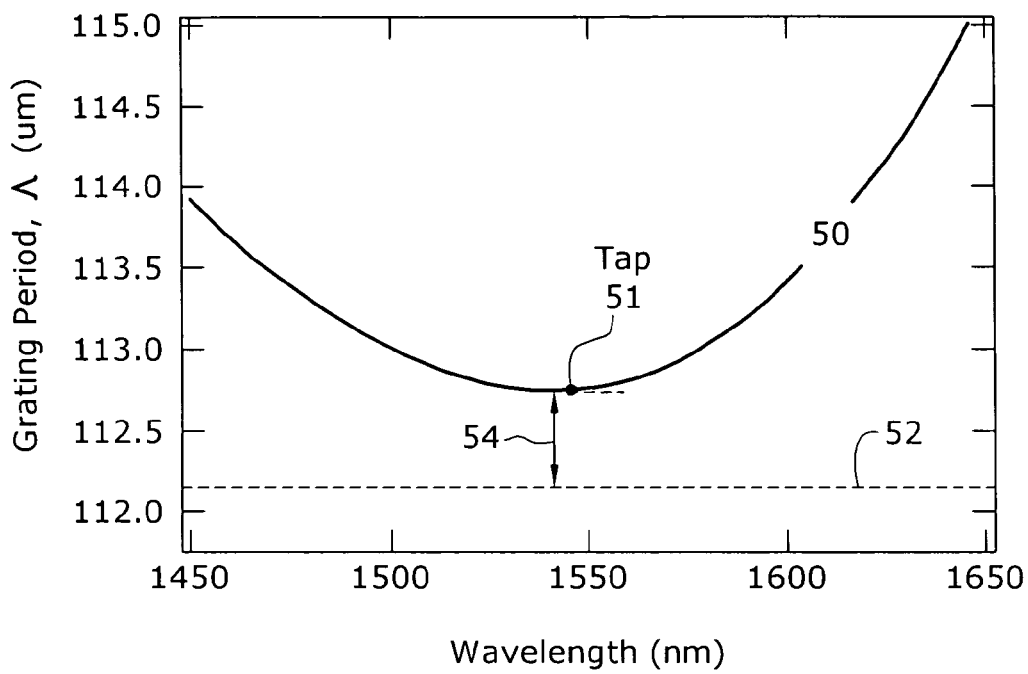
FIG. 5 is a graph of an exemplary phase matching curve and associated grating period line, illustrating the ability to modify the grating period to match the TAP point of the phase matching curve.

Thus, in accordance with the present invention, the coupling strength of an LPG can be deduced by inspecting the phase matching curve and associated line defining the period of the grating. One such example is illustrated in FIG. 5. As shown, curve 50 represents an exemplary phase matching curve for a particular LPG, where in this case the LPG has a grating period $\Lambda$ of approximately 112.1 $\mu$m (indicated by horizontal line 52 in FIG. 5). The relative coupling strength at any wavelength is then proportional to the length of a line 54 connecting phase matching curve 50 to grating period line 52. It is to be understood that this relationship is strictly true for only Gaussian apodized gratings, and is approximately true for uniform gratings. In conclusion, therefore, the coupling strength of this new class of gratings may be changed without significantly perturbing their spectral shapes.

Figure 6:
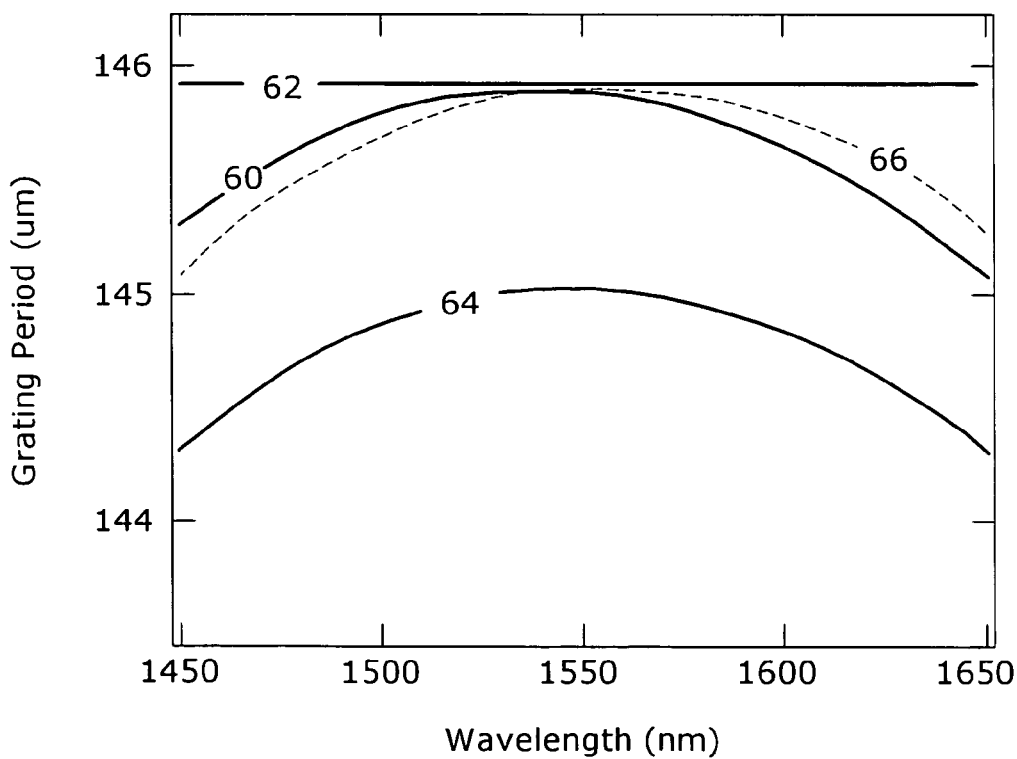
FIG. 6 is a graph of a set of phase matching curves, illustrating the ability to alter (etch) the outer diameter of the LPG to regain the TAP resonance condition as the ambient refractive index changes.

As was shown in FIG. 2 and can be explained in the context of FIG. 5, changing the refractive index of the "coating" (which may be, as mentioned above, the ambient atmosphere, such as air containing a trace gas) results in shifting the phase matching curve of a TAP LPG, thus resulting in varying the coupling strength. Indeed, the sensitivity to $n_{coat}$ is determined by the proximity of the grating period to a TAP, where in FIG. 5 the grating period is illustrated by line 52 and the TAP of curve 50 is illustrated by minima 56. The grating period can then be matched to TAP 56 for any coating refractive index $n_{coat}$ by one of at least two techniques: (1) the grating period $\Lambda$ can be physically changed, such as by strain or temperature; or (2) the cladding outer dimension D can be changed. FIG. 6 illustrates a first phase matching curve 60 associated with an LPG exhibiting a TAP condition between the fundamental order core area mode and higher-order cladding mode for an LPG fiber with an outer diameter D=125 $\mu$m and $n_{coat}=1$, with a grating period $\Lambda$ of 145.9 $\mu$m (horizontal line 62 in FIG. 6), illustrating in this case a TAP resonance condition at a wavelength $\lambda$ of approximately 1550 nm. When the refractive index of the coating increases to a value of 1.43, the phase matching curve shifts downward away from this resonant condition, as illustrated by curve 64 in FIG. 6. The LPG fiber is returned to resonance in this case by changing the diameter D of the fiber. In particular, the cladding layer (such as layer 14) is etched such that D is reduced to 124.5 $\mu$m. Lowering the outer diameter raises the phase matching curve, as shown by curve 66 in FIG. 6, to recover the TAP resonance condition. Thus, in accordance with the present invention, a TAP condition and a broadband, strength-tunable resonance may be obtained for any ambient refractive index value.

Further, it is also possible to write a grating with a predetermined period $\Lambda$ associated with the "TAP condition" (i.e., slope equals zero) of a give phase matching curve. This aspect of the present invention is particularly useful in constructing a device with arbitrary sensitivity to the coating index $n_{coat}$ and is a result of the fact that the propagation constants of the cladding modes are critically dependent on the refractive index value of the coating, as shown below:

$$\frac{d\beta}{dn_{coat}} \propto \frac{n_{coat}}{(n_{cl}^2 - n_{coat}^2)^{3/2}}$$

This relation clearly shows that the rate of change of the propagation constant of the cladding mode increases monotonically with the refractive index of the coating material, that is, as $n_{coat}$ approaches the silica-cladding index, $n_{cl}$. Since it was previously shown that a rapid change in the propagation constants of either mode leads to rapid changes in attenuation level for the TAP LPG device, it is now evident that the LPG attenuation also becomes increasingly sensitive to changes in the refractive index of the "coating", particularly as the refractive index approaches the value associated with the silica cladding. This effect, combined with the fact that a TAP condition can be obtained for any desired coating index value, as discussed above in association with FIG. 6, allows for the construction of an LPG device whose attenuation level can be made arbitrarily sensitive to the outside/ambient "coating" refractive index.

FIGS. 7(*a*) and 7(*b*) illustrate two sets of broadband spectra obtained for devices that are identical in all respects, except for the "coating" refractive index values and outer cladding diameter D, where the cladding diameter D is adjusted in each case to arrive at the TAP resonance condition for each refractive index value. Referring to FIG. 7(*a*), it is shown that an index change of approximately $5 \times 10^{-3}$ is required when the ambient coating index is approximately 1.4325 (to obtain a 25 dB attenuation change). Looking at the spectra of FIG. 7(*b*), it is shown that an index change of only $4 \times 10^{-4}$ is required when the ambient/coating refractive index is 1.44856. FIG. 8 contains a graph charting the experimentally observed monotonic decrease in required index change for $n_{coat}$ required to induce a 25 dB strength change in the TAP LPG of the present invention as a function of the ambient refractive index. From this relationship, it is clear that the TAP LPG device of the present invention can be configured to achieve arbitrarily high sensitivities, such as those required for high-frequency modulation.

Figure 7A:
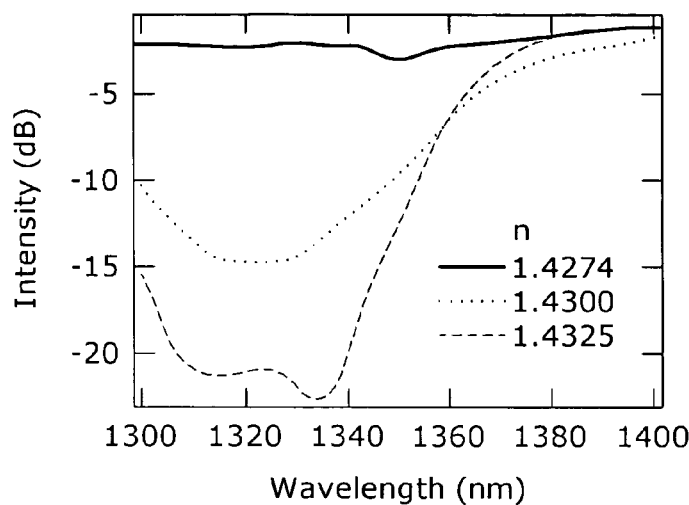
FIGS. 7(a) and 7(b) illustrate spectra associated with the TAP resonance condition for a variety of different ambient refractive index values.
Figure 7B:
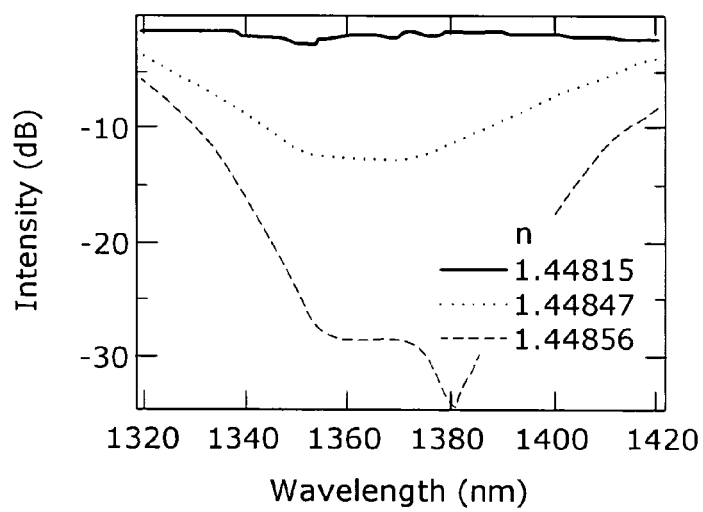
Figure 8:
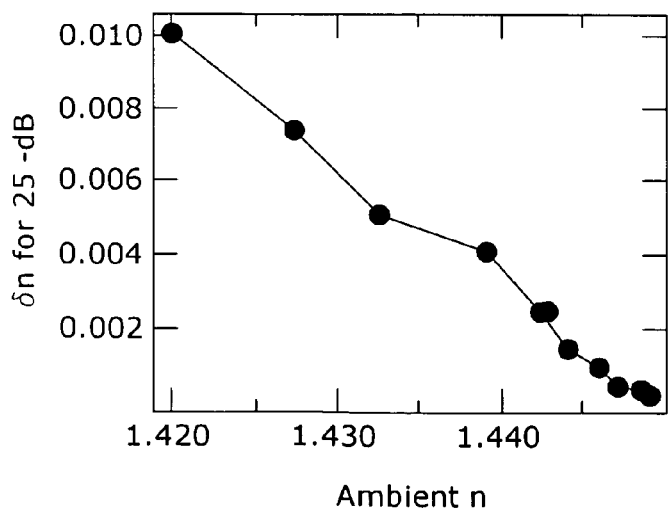
FIG. 8 is a graph charting the required change in the ambient refractive index to induce a 25 dB strength change as a function of the ambient refractive index.

It is to be noted that while the increased sensitivity to changes in ambient index as illustrated in FIGS. 7(a) and 7(b) were obtained by adjusting the cladding outer diameter D, the same effect can be observed by adjusting the grating period of the actual grating written in the core area of the LPG to coincide with the zero slope point of the phase matching curve. More generally, the ability to obtain a TAP resonance condition for any arbitrary ambient index configuration may be enabled by one of several mechanisms including, but not limited to, modifying the grating period, inducing a DC voltage-based index change, changing the ambient temperature, changing the strain on the fiber grating, nominal etching of the fiber cladding, or any combination of the above.

Figure 9:
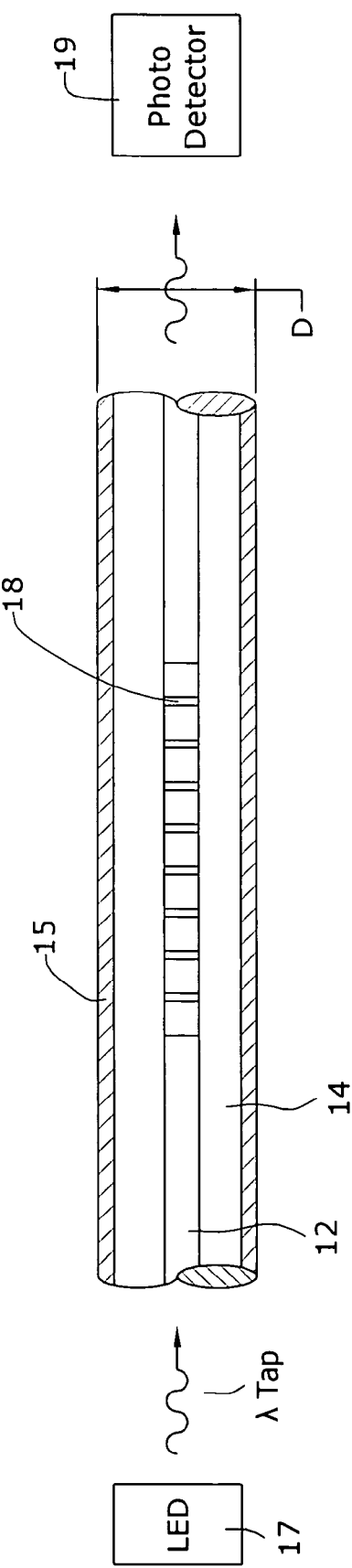
FIG. 9 illustrates an exemplary LPG trace gas detector formed in accordance with the present invention.

As mentioned above, there are many practical applications for an LPG device that offers variable coupling (or attenuation) levels with sensitivity to changes in the ambient refractive index. In particular, an LPG device of the present invention may be formed as shown in FIG. 9 to include a coating material 15 surrounding cladding layer 14, where coating material 15 induces efficient absorption of trace elements/chemicals in specific compounds or ambient gases that are desired to be detected. The incorporation of these trace elements thus changes the refractive index of coating 15, thereby changing the transmitted intensity through the device over a relatively broad wavelength range. Since the attenuation level changes over such a broad range, an LED 17 with a center wavelength approximately equal to the TAP wavelength, denoted $\lambda_{TAP}$, and a simple photodetector 19 coupled to the output of device 10, yields a sensor whose detected intensity changes with relatively small changes in the refractive index of coating 15. Since this device can be made arbitrarily sensitive to index changes (using any of the methods defined above), extremely small levels of contamination can be sensed.

Figure 10:
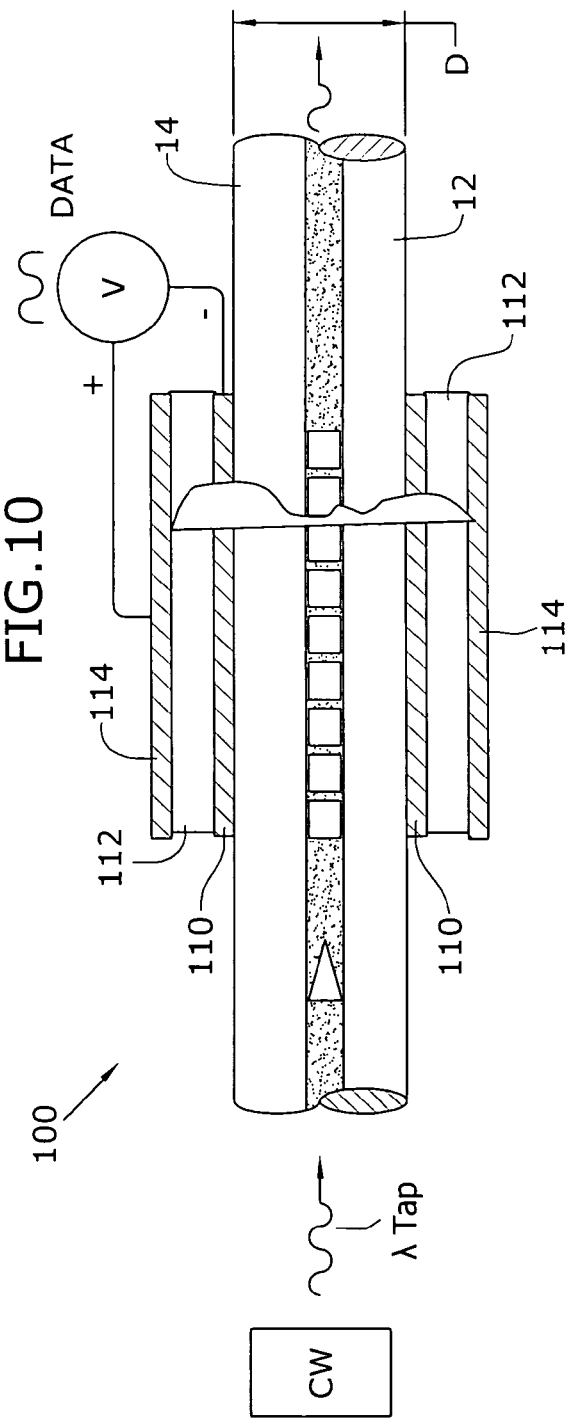
FIG. 10 illustrates an exemplary all-fiber high-speed LPG-based optical modulator formed in accordance with the present invention.

The cladding diameter D and coating refractive index $n_{coat}$ can be adjusted, as discussed above, to yield an LPG device with an approximate 25 dB transmission change for coating index changes of $2 \times 10^{-4}$ or less. Since electro-optic polymers can offer fast transmission rates (e.g., approximately 300 GHz speed) but only relatively small refractive index changes (less than $5 \times 10^{-4}$), a TAP LPG device of the present invention can be used to implement a high speed, polarization insensitive, all-fiber-based data modulator. FIG. 10 illustrates one exemplary modulator 100, including a relatively thin electrode 110 disposed to surround cladding layer 14. The material of thin electrode 110 is selected to be relatively transparent to the optical field of the cladding mode induced by the LPG, where the compound indium-tin-oxide (ITO) may be used. ITO is a conductor that is transparent to 1550 nm light and is thus an optimal candidate. Gold or silver may also be used, inasmuch as both of these materials that are opaque to 1550 nm light. In any case, the thickness of conducting electrode 110 is minimized so as to not perturb the optical field of the cladding mode. A layer of electro-optic material 112 is disposed to surround thin electrode 110, as shown in FIG. 10, with an outer electrode 114 disposed over electro-optic material 112. In operation, a continuous wave (CW) optical signal is coupled to the input of modulator 100, where the wavelength of the CW signal is selected, in combination with the grating period of the device, to exhibit the TAP condition. An electrical modulating data input signal is applied between electrodes 114 and 112, the voltage modulation changing the value of $n_{coat}$, the refractive index of electro-optic material 112. The modulation of this refractive index thus results in modulating the coupling strength of the propagating optical signal, providing a high speed modulated optical output signal.

It is to be understood that although the above-described embodiments illustrated the phase matching "turn around point" as associated with a group velocity matching between the fundamental mode and a higher-order cladding mode, a TAP condition can be formed between any two (or more) matched modes, whether core-propagating modes or cladding-propagating modes. In this context, the choice of the kind of LPG used to fabricate the TAP LPG device of the present invention depends upon the preferred mode(s) of choice. For example, it may be preferable to use symmetric gratings (such as UV-induced LPGs) for coupling between the fundamental mode ($LP_{01}$) and a symmetric mode (such as the $LP_{0,12}$ mode). In contrast, it may be preferable to use asymmetric gratings (such as microbend LPGs induced by pressing corrugated surfaces on the fiber, or by acousto-optic excitation) for coupling the fundamental mode with an anti-symmetric mode (such as the $LP_{1,12}$ mode) of the fiber. Indeed, the subject matter of the present invention is intended to be limited only by the scope of the claims appended hereto.

What is claimed is:

1. A long period fiber grating configured to be sensitive to relatively small changes in the ambient refractive index, the long period fiber grating comprising
    a core area including a grating with a predetermined period $\Lambda$;
    a cladding region surrounding the core area, the cladding region exhibiting a refractive index defined as $n_{cl}$ and having a predefined outer diameter D, the combination of the core area and the cladding region capable of supporting two different propagating modes such that when the group velocity of the two different propagating modes match a zero slope point is formed in their phase matching curve, defined as a "turn-around-point" (TAP); and
    a coating/ambient area surrounding the cladding region and having a refractive index $n_{coat}$ greater than $n_{cl}$, wherein the relation between the TAP and the grating period is a function of the value of $n_{coat}$ and changes in the separation between the TAP and the grating period are directly proportional to changes in the coating/ambient refractive index.

2. A long period fiber grating as defined in claim 1 wherein the TAP coincides with the predetermined grating period, creating a TAP resonance condition where large bandwidth mode coupling is achieved.

3. A long period fiber grating as defined in claim 2 wherein the TAP resonance condition is created by modifying the outer cladding diameter D until the TAP coincides with the predetermined grating period.

4. A long period fiber grating as defined in claim 2 wherein the TAP resonance condition is created by physically changing the grating period $\Lambda$ until the TAP coincides with the predetermined grating period.

5. A long period fiber grating as defined in claim 2 wherein the TAP resonance condition is created by writing the fiber grating to exhibit a grating period that coincides with the TAP of the phase matching curve.

6. A long period fiber grating as defined in claim 1 wherein changes in ambient refractive index at least as small as $10^{-4}$ can be sensed.

7. A long period fiber grating as defined in claim 1 wherein the coating/ambient area comprises an organic material.

8. A long period fiber grating as defined in claim 1 wherein the coating/ambient area comprises a inorganic material.

9. A long period fiber grating as defined in claim 1 wherein the coating/ambient area comprises an atmosphere including trace elements.

10. A detector for sensing the presence of trace elements in an atmosphere, the detector comprising
   a long period fiber grating including
      a core area including a grating with a predetermined period $\Lambda$;
      a cladding region surrounding the core area, the cladding region exhibiting a refractive index defined as $n_{cl}$ and having a predefined outer diameter D, the combination of the core area and the cladding region capable of supporting two different propagating modes such that when the group velocity of the two different propagating modes match a zero slope point is formed in their phase matching curve, defined as a "turn-around-point" (TAP); and
      a coating/ambient area surrounding the cladding region and having a refractive index $n_{coat}$ greater than $n_{cl}$, wherein the relation between the TAP and the grating period is a function of the value of $n_{coat}$ and changes in the separation between the TAP and the grating period are directly proportional to changes in the coating/ambient refractive index
   a light source coupled to the input of the long period fiber grating, the light source providing an input signal at the TAP resonant wavelength $\lambda_{TAP}$; and
   a photodetector coupled to the output of the long period fiber grating, wherein changes in the coating/ambient refractive index associated with the presence of trace elements results in changes in the propagating signal intensity received by the photodetector.

11. A detector as defined in claim 10 wherein the light source comprises an LED.

12. An all-fiber high speed optical signal modulator, the modulator comprising a long period fiber grating including
   a core area including a grating with a predetermined period $\Lambda$; and
   a cladding region surrounding the core area, the cladding region exhibiting a refractive index defined as $n_{cl}$ and having a predefined outer diameter D, the combination of the core area and the cladding region capable of supporting two different propagating modes such that when the group velocity of the two different propagating modes match a zero slope point is formed at a wavelength $\lambda_{TAP}$ in their phase matching curve, defined as a "turn-around-point" (TAP);
   an inner electrode disposed to surround a portion of the cladding region;
   a relatively thin layer of electro-optic material disposed to cover the inner electrode; and
   an outer electrode disposed to cover the relatively thin layer of electro-optic material;
   an optical signal source disposed to couple a continuous wave optical signal operating at a wavelength of $\lambda_{TAP}$ into the core region of the long period fiber grating;
   an electrical modulating data source coupled between the inner and outer electrodes, wherein the modulating voltage causes a modulating change in the refractive index of the electro-optic material, thereby modulating the intensity of the optical signal propagating through the long period fiber grating; and
   an optical receiver coupled to receive the modulated optical signal exiting the long period fiber grating.

13. An all-fiber high speed optical signal modulator as defined in claim 12 wherein the inner electrode comprises indium-tin-oxide.

* * * * *